US012574242B2

(12) United States Patent
Wagner

(10) Patent No.: US 12,574,242 B2
(45) Date of Patent: Mar. 10, 2026

(54) CONTROLLED PRIVACY IN BIOMETRIC IDENTIFICATION

(71) Applicant: VISA INTERNATIONAL SERVICE ASSOCIATION, San Francisco, CA (US)

(72) Inventor: Kim Wagner, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 19/118,583

(22) PCT Filed: May 10, 2024

(86) PCT No.: PCT/US2024/028931
§ 371 (c)(1),
(2) Date: Apr. 4, 2025

(87) PCT Pub. No.: WO2025/235007
PCT Pub. Date: Nov. 13, 2025

(65) Prior Publication Data
US 2025/0350469 A1      Nov. 13, 2025

(51) Int. Cl.
*H04L 29/06* (2006.01)
*H04L 9/00* (2022.01)
*H04L 9/32* (2006.01)

(52) U.S. Cl.
CPC ............ *H04L 9/3231* (2013.01); *H04L 9/008* (2013.01)

(58) Field of Classification Search
CPC ....... H04L 9/3231; H04L 9/008; G06F 21/32; G06F 21/6254; G06Q 20/40145;
(Continued)

(56) References Cited

U.S. PATENT DOCUMENTS

2014/0314283 A1* 10/2014 Harding ................. G06V 40/70
382/115
2017/0140174 A1* 5/2017 Lacey ................ G06Q 20/4016
(Continued)

FOREIGN PATENT DOCUMENTS

WO      WO-2022067437 A1 *   4/2022   ........... G06F 21/316

OTHER PUBLICATIONS

SRNT (Year: 2022).*
Application No. PCT/US2024/028931 , International Search Report and Written Opinion, Mailed On Feb. 10, 2025, 8 pages.

*Primary Examiner* — Edward Zee
*Assistant Examiner* — Leynna Truvan
(74) *Attorney, Agent, or Firm* — Kilpatrick Townsend & Stockton LLP

(57)      ABSTRACT

Described herein is a biometric identification technique that includes a gateway computer receiving a first set of encrypted match scores and a set of enrollment biometric template identifiers associated with the first set of encrypted match scores from a first database server. The first set of encrypted match scores are decrypted to obtain a first set of match scores, and a subset of enrollment biometric template identifiers of the set of enrollment biometric template identifiers is determined based on a subset of match scores in the first set of match scores. The subset of enrollment biometric template identifiers is transmitted to a second database server, wherein the second database server is programmed to compare a second encrypted reference biometric template to encrypted enrollment biometric templates corresponding to the subset of enrollment biometric template identifiers and generate a second set of encrypted match scores.

18 Claims, 6 Drawing Sheets

(58) Field of Classification Search
CPC ...... G06V 40/50; G06V 40/70; G06V 30/248;
G07C 9/25; G07C 9/37; G07C 2209/12;
G16Y 20/40; G07D 7/206; H04M
2203/6054; H04N 21/4415; F41A 17/066;
G03G 15/5091
See application file for complete search history.

(56) References Cited

U.S. PATENT DOCUMENTS

| | | | |
|---|---|---|---|
| 2021/0194875 A1 | 6/2021 | Wagner et al. | |
| 2021/0211290 A1 | 7/2021 | Jindal et al. | |
| 2021/0367786 A1 | 11/2021 | Sheets et al. | |
| 2022/0245224 A1* | 8/2022 | Rojas | G06V 40/197 |

* cited by examiner

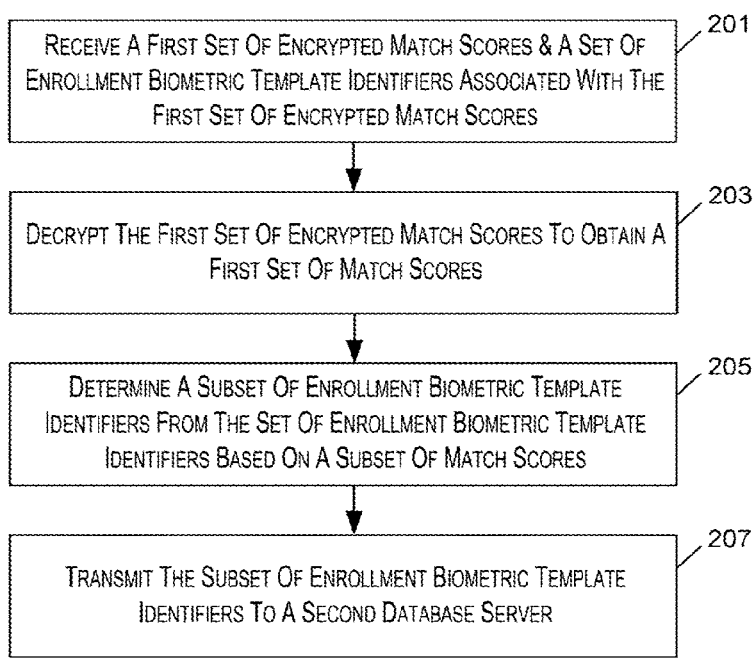

RECEIVE A FIRST SET OF ENCRYPTED MATCH SCORES & A SET OF ENROLLMENT BIOMETRIC TEMPLATE IDENTIFIERS ASSOCIATED WITH THE FIRST SET OF ENCRYPTED MATCH SCORES ⟋201

DECRYPT THE FIRST SET OF ENCRYPTED MATCH SCORES TO OBTAIN A FIRST SET OF MATCH SCORES ⟋203

DETERMINE A SUBSET OF ENROLLMENT BIOMETRIC TEMPLATE IDENTIFIERS FROM THE SET OF ENROLLMENT BIOMETRIC TEMPLATE IDENTIFIERS BASED ON A SUBSET OF MATCH SCORES ⟋205

TRANSMIT THE SUBSET OF ENROLLMENT BIOMETRIC TEMPLATE IDENTIFIERS TO A SECOND DATABASE SERVER ⟋207

FIG. 2

CONTROLLED PRIVACY IN BIOMETRIC IDENTIFICATION

CROSS REFERENCE TO RELATED APPLICATIONS

This application is 371 patent application which claims the benefit of the filing date of International Patent Application No. PCT/US2024/028931 filed May 10, 2024, which is herein incorporated by reference in its entirety for all purposes.

BACKGROUND

Biometric instances, such as fingerprint scans, facial images, and iris scans, are typically unique among user and are difficult to replicate or forge, As such, biometric instances are useful tools for authenticating users. Typically, a central repository e.g., a server, stores a plurality of biometric instances (referred to as a gallery of enrollment biometric instances) in a database, and determines whether a match exists between a biometric instance submitted by a user (referred to as a transaction biometric instance) and one of the enrollment biometric instances.

A determination is made by comparing the transaction biometric instance to each enrollment biometric instance included in the gallery of enrollment biometric instances. Such a process of searching for a match between the transaction biometric reference and an enrollment biometric reference has a couple of disadvantages—(i) if the gallery of enrollment biometric instances is large (which is typically the case), the process of searching for a match is time consuming, and (ii) if the biometric instances are stored in an unencrypted format, not only is the process of searching for a match time consuming, but the server poses a security concern e.g., constitutes a rich target for hackers of fraudulent entities.

With an aim to improve the security concerns, one solution is to store the enrollment biometric instances in an encrypted form. However, in the case, each enrollment biometric instance would have to be decrypted when being compared to the transaction biometric reference or a homomorphic encryption (HE) mechanism would have to be employed. The HE mechanism would imply that the database is encrypted and could identify a best match without linking a plaintext of the biometric instance to the identified person. From a privacy and security point of view, such an approach is very attractive. However, the HE mechanism adds orders of magnitude of transaction time, and thus is not feasible to be executed for biometric identification purposes for even a moderately sized gallery of enrollment biometric instances e.g., 10,000 biometric instances.

Embodiments of the invention address these and other problems individually and collectively.

Embodiments of the present disclosure provide for an efficient biometric identification system.

One embodiment includes a method including: receiving, by a gateway computer, a first set of encrypted match scores from a first database server and a set of enrollment biometric template identifiers associated with the first set of encrypted match scores, each encrypted match score in the first set of encrypted match scores being generated by comparing a first encrypted reference biometric template and an enrollment biometric template of a plurality of enrollment biometric templates stored in the first database server in an encrypted domain; decrypting, by the gateway computer, the first set of encrypted match scores to obtain a first set of match scores;

determining, by the gateway computer, a subset of enrollment biometric template identifiers of the set of enrollment biometric template identifiers based on a subset of match scores in the first set of match scores; and transmitting, by the gateway computer, the subset of enrollment biometric template identifiers to a second database server, wherein the second database server is programmed to compare a second encrypted reference biometric template to encrypted enrollment biometric templates corresponding to the subset of enrollment biometric template identifiers and generate a second set of encrypted match scores by comparing the second encrypted reference biometric template to each of the encrypted enrollment biometric templates corresponding to the subset of enrollment biometric template identifiers.

Another embodiment is directed to a gateway computer that comprises a processor and a non-transitory computer readable medium coupled to the processor and comprising code, executable by the processor, for implementing a method comprising: (i) receiving a first set of encrypted match scores from a first database server and a set of enrollment biometric template identifiers associated with the first set of encrypted match scores, each encrypted match score in the first set of encrypted match scores being generated by comparing a first encrypted reference biometric template and an enrollment biometric template of a plurality of enrollment biometric templates stored in the first database server in an encrypted domain; (ii) decrypting the first set of encrypted match scores to obtain a first set of match scores; (iii) determining a subset of enrollment biometric template identifiers of the set of enrollment biometric template identifiers based on a subset of match scores in the first set of match scores; and (iv) transmitting the subset of enrollment biometric template identifiers to a second database server, wherein the second database server is programmed to compare a second encrypted reference biometric template to encrypted enrollment biometric templates corresponding to the subset of enrollment biometric template identifiers and generate a second set of encrypted match scores by comparing the second encrypted reference biometric template to each of the encrypted enrollment biometric templates corresponding to the subset of enrollment biometric template identifiers.

One aspect of the present disclosure is directed to a method performed by a first database server, the method comprises the steps of: receiving, by a first database server, a first encrypted reference biometric template and a group identifier from a processing computer, wherein the first database server includes a first database that stores a plurality of groups of encrypted enrollment biometric templates, each group of the plurality of groups of encrypted enrollment biometric templates being characterized by one or more features; obtaining, by the first database server, a plurality of encrypted enrollment biometric templates included in a first group, the first group being identified via the group identifier; generating, by the first database server, a first set of encrypted match scores, wherein each encrypted match score in the first set of encrypted match scores is generated by comparing the first encrypted reference biometric template and an encrypted enrollment biometric template included in the plurality of encrypted enrollment biometric templates; and transmitting, by the first database server, the first set of encrypted match scores and a set of enrollment biometric template identifiers associated with the first set of encrypted match scores to a gateway computer.

Another embodiment is directed to a first database server that comprises a processor and a non-transitory computer readable medium coupled to the processor and comprising code, executable by the processor, for implementing a method comprising: receiving, by a first database server, a first encrypted reference biometric template and a group identifier from a processing computer, wherein the first database server includes a first database that stores a plurality of groups of encrypted enrollment biometric templates, each group of the plurality of groups of encrypted enrollment biometric templates being characterized by one or more features; obtaining, by the first database server, a plurality of encrypted enrollment biometric templates included in a first group, the first group being identified via the group identifier; generating, by the first database server, a first set of encrypted match scores, wherein each encrypted match score in the first set of encrypted match scores is generated by comparing the first encrypted reference biometric template and an encrypted enrollment biometric template included in the plurality of encrypted enrollment biometric templates; and transmitting, by the first database server, the first set of encrypted match scores and a set of enrollment biometric template identifiers associated with the first set of encrypted match scores to a gateway computer.

Further details regarding embodiments of the invention can be found in the Detailed Description and the Figures.

BRIEF DESCRIPTION OF THE DRAWINGS

FIG. 2 depicts a flowchart illustrating steps performed by a gateway computer included in the biometric identification system according to some embodiments of the invention.

DETAILED DESCRIPTION

Figure 1:
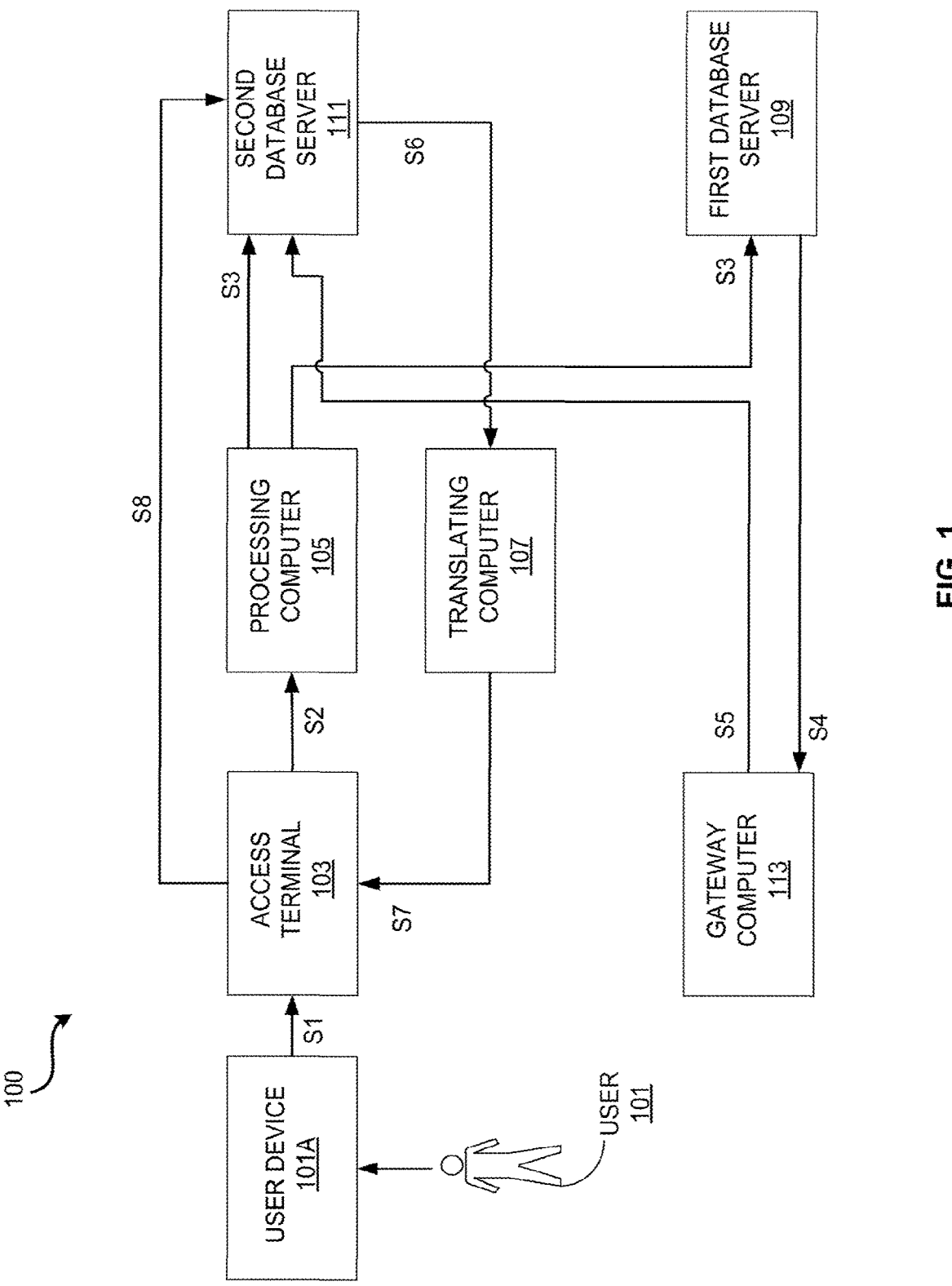
FIG. 1 depicts a block diagram of a controlled privacy biometric identification system according to some embodiments of the invention.

Prior to discussing embodiments of the invention, some terms can be described in further detail.

The term "database server" or "database server computer" may include a powerful computer or cluster of computers. For example, the database server can be a large mainframe, a minicomputer cluster, or a group of servers functioning as a unit. In one example, the database server may be coupled to a Web server. The database server may be coupled to a database and may include any hardware, software, other logic, or combination of the preceding for servicing the requests from one or more client computers. The database server may comprise one or more computational apparatuses and may use any of a variety of computing structures, arrangements, and compilations for servicing the requests from one or more user devices. In some embodiments, a database server may be a remote database server computer. A remote database server computer may be geographically located remotely in reference to a user device.

A "user device" may be any suitable device that can interact with a user (e.g., a payment card or mobile phone). In some embodiments, a user device may communicate with or may be at least a part of a processing computer. User devices may be in any suitable form. Some examples of user devices include cellular phones, personal digital assistants (PDAs), personal computers (PCs), tablet PCs, hand-held specialized readers, set-top boxes, electronic cash registers (ECRs), automated teller machines (ATMs), virtual cash registers (VCRs), kiosks, and security systems, remote computers operating Websites, and the like. In some embodiments, a user device may use any suitable contact or contactless mode of operation to send or receive data from, or associated with, a payment device and/or a mobile device. In some embodiments, where a user device may comprise a mobile device, any suitable mobile device may be used and may include a display, a memory, a processor, a computer-readable medium, and any other relevant component.

A "user" may include an individual. In some embodiments, a user may be associated with one or more personal accounts and/or user devices.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. In some embodiments, a key may be any string of bits used by a cryptographic algorithm to transform plain text into cipher text or vice versa. Keys may include symmetric and asymmetric keys. A key may be used to sign data transfer request/response messages. For example, a data transfer request/response message may be signed using a private key. The signed data transfer request/response message may then be verified using a public key that corresponds to the private key.

A "public key" may be a type of key that is distributed to, or available to, some entity other than a party holding a corresponding private key. The public key may be designed to be shared and may be configured such that any information encrypted with the public key may only be decrypted using a private key associated with the public key (i.e., a public/private key pair).

A "private key" may include any encryption key that may be protected and secure. For example, the private key may be securely stored at an entity that generates a public/private key pair and may be used to decrypt any information that has been encrypted with the associated public key of the public/private key pair. A private key may be used to sign data such that the data may be verified by another electronic device.

A "public/private key pair" may include a pair of linked cryptographic keys generated by an entity. The public key may be used for functions such as encrypting a message and/or data to send to an entity or for verifying a digital signature which was supposedly made by the entity. The private key, on the other hand may be used for functions such as decrypting a received message or applying a digital signature. The public key may be authorized by a body known as a certification authority (i.e., certificate authority) which can store the public key in a database and distributes it to any other entity which requests it. The private key may be kept in a secure storage medium and will usually only be known to the entity. However, the cryptographic systems described herein may feature key recovery mechanisms for recovering lost keys and avoiding data loss. In some embodiments, the entity may securely discard (i.e., destroy) the private key.

A "biometric sample" includes data that can be used to uniquely identify an individual based upon one or more intrinsic physical or behavioral traits. For example, a biometric sample may include retinal scan and tracking data (i.e., eye movement and tracking where a user's eyes are focused). Further examples of biometric samples include a face, fingerprint, voiceprint, palm print, DNA, body scan, etc.

A "biometric template" can be a digital reference of distinct characteristics that have been extracted from a biometric sample provided by a user. Biometric templates are used during a biometric authentication process. Data from a biometric sample provided by a user at the time of authentication can be compared against previously created biometric templates to determine whether the provided biometric sample closely matches one or more of the stored biometric templates. The data may be either an analog or digital representation of the user's biometric sample. For example, a biometric template of a user's face may be image data, and a biometric template of a user's voice may be an audio file. Biometric templates can further include date representing measurements of any other intrinsic human traits or distinguishable human behaviors, such as fingerprint data, retinal scan data, deoxyribonucleic acid (DNA) date, palm print data, hand geometry date, iris recognition data, vein geometry data, handwriting style data, and any other suitable data associated with physical or biological aspects of an individual. For example, a biometric template may be a binary mathematical file representing the unique features of an Individual's fingerprint, eye, hand or voice needed for performing accurate authentication of the individual.

A "biometric reader" may refer to a device for measuring a biometric. Examples of biometric readers may include fingerprint readers, front-facing cameras, microphones, iris scanners, and DNA analyzers.

The term "biometrics instance" may include information related to a biological observation. A biometric instance may include biometric data corresponding to a biometric sample, or a biometric template derived from the biometric sample or the biometric data. A biometric instance may be used to verify the identity of a user. In some embodiments, a device such as a mobile device or an access terminal may capture a biometric instance. A biometric instance may be captured via a biometric interface, hardware used to capture biometric instances. For example, a biometric instance may be captured via a biometric interface such as an iris scanner, comprising an infrared light source and a camera. Examples of biometric instances include digital representations of iris scans (e.g., binary codes that represent an iris), fingerprints, voice recordings, face scans, etc. Biometric instances may be represented as vectors for the purpose of comparing biometric instances, e.g., two biometric instances may be compared by performing a scalar product of two vector representations of those biometric instances. Biometric instances may be stored in an encrypted format and/or on a secure memory of a mobile device.

A "derivative" of a biometric instance may include any information or data derived from the biometric instance, or any information or data generated in order to process the biometric instance. As an example, a garbled circuit used to compare a first biometric instance and a second biometric instance as part of a secure multi-party computation can be a derivative of the first biometric instance and/or the second biometric instance. As another example, the output of a function that takes a biometric instance as an input can be a derivative of a biometric instance, such as a function that produces the negation of a biometric instance (i.e., if a biometric instance is represented by a binary vector such as 1010101, the negation 0101010 is a derivate of a biometric instance). Other examples include encrypted biometric instances and masked biometric instance (e.g., a biometric instance summed with a random value). A random string produced by a fuzzy extraction is another example of a derivative of a biometric instance.

The term "demographics information," may refer to information that describes the demographic characteristics of a user. Demographics information may include information such as the user's age, height, weight, hair color, facial structure, biological sex, ethnicity, socio-economic status, etc. In some cases, demographics information may be inferred from a biometric instance. For example, an iris scan may be used to infer a user's ethnicity. Demographics information may be used to filter users, e.g., selecting users with specific demographics information (e.g., black-haired women, red-haired men, etc.). Examples of biometric instances include fingerprint scans, palm print scans, palm vein scan, hand geometry scan, iris scan, retina scan, face scan, and voice recordings, among others.

The term "cryptographic key" may refer to something used in encryption or decryption. As an example, a cryptographic key can refer to a product of two large prime numbers. A cryptographic key may serve as an input in a cryptographic process or cryptosystem, such as RSA or AES, and may be used to encrypt plaintext and produce a ciphertext output, or decrypt ciphertext and produce a plaintext output.

The term "plaintext" may refer to text that is in a plain form. For example, plaintext could refer to text which a human or a computer could read without any processing, such as the phrase "hello, how are you?" It may also refer to text which is in an unencrypted form. Numbers or other symbols may also qualify as plaintext.

A "threshold" can be a minimum prescribed level and/or value. For example, a threshold can identify or quantify what degree of similarity is needed between two biometric templates (or other data) in order for the two biometric templates to qualify as a match. As an illustration, fingerprints contain a certain number of identifying features, if a threshold (e.g., 90%) amount of identifying features of a newly measured fingerprint are matched to a previously measured fingerprint, then the two fingerprints can be considered a match (and the probability that both fingerprints are from the same person may be high). Setting an appropriate threshold to ensure an acceptable level of accuracy and/or confidence would be appreciated by one of ordinary skill in the art.

An "access terminal" may be any suitable device that provides access to a remote system. An access terminal may also be used for communicating with a merchant computer, a transaction processing computer, an authentication computer, or any other suitable system. An access terminal may generally be located in any suitable location, such as at the location of a merchant. An access terminal may be in any suitable form. Some examples of access terminals include point of sale (POS) terminals, cellular phones, PDAs, personal computers (PCs), tablet PCS, hand-held specialized readers, set-top boxes, electronic cash registers (ECRs), automated teller machines (ATMs), virtual cash registers (VCRs), kiosks, security systems, access systems, and the like. An access terminal may use any suitable contact or contactless mode of operation to send or receive data from, or associated with, a user mobile device. In some embodiments, where an access terminal may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal. An access terminal may be capable of capturing biometric instances using a biometric interface, such as a high resolution camera user to perform iris scans. An access terminal may also be capable of generating demographics information from biometrics instances, e.g., determining a user's ethnicity from an iris scan. Access terminals may also perform demographics filtration and biometrics matching during or preceding an interaction. For example, an access terminal may perform a biometric matching procedure as part of authorizing a transaction between a customer and a merchant operating the access terminal.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor: Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "local data connection" can include a short range communication connection between two or more devices that are intended to interact with each other. A local data connection can be formed using an RF mode of communication such as near field communications (NF), Bluetooth, Bluetooth Low Energy (BLE), etc. In other embodiments, another mode of communication such as light (e.g., infrared) or audio signals may be used. In aspects of the present disclosure, one or more user devices may each form a local data connection with a server computer.

"Transaction data" refers to information or records generated as a result of a transaction (e.g., financial, or non-financial transactions) between parties or entities. Transaction data typically includes details about the exchange of goods, services, or financial assets. For instance, transaction data may include any suitable data corresponding to a transaction such as account information for a payment account (e.g., a PAN, payment token, expiration date, card verification values (e.g., CVV, CVV2), dynamic card verification values (dCVV, dCVV2), an identifier of an issuer with which an account is held) etc.

A "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, wearable devices (e.g., watches), vehicles (e.g., cars), etc. A mobile device may comprise any suitable hardware and software for performing such functions and may also include multiple devices or components (e.g., when a device has remote access to a network by tethering to another device—i.e., using the other device as a relay—both devices taken together may be considered a single mobile device).

Biometric instances such as fingerprints, iris scans, etc., are typically unique among users and are difficult to replicate or forge. As such, biometric instances are useful tools for authenticating users, e.g., in airport security screenings to verify a traveler's identity before they board a plane. The traveler can have their iris or palm scanned, and the biometric instance (or alternatively a biometric template of the biometric instance) can be used to search a database of biometric templates in order to verify the traveler's stated identity. Biometric templates can also be used by users in order to prove that they have authorized an interaction. As an example, if a user wants to open an electronic gate to let a guest into their home, the user can scan their palm to prove to a control system that the user, and not an imposter, is requesting the gate be opened.

Biometric templates include sensitive personally identifying information (PII). A stolen biometric template can be used to perform identity fraud by allowing a malicious entity to convincingly impersonate a user. As such, biometric templates stored in electronic form can be safeguarded in order to prevent them from being stolen by thieves and hackers, for example, by being stored in encrypted form or stored on a secure memory element. Biometric matching procedures can be designed to reduce the risk of exposing biometric instances, using techniques such as secure multi-party computation, fuzzy extraction, and homomorphic encryption.

In biometric matching processes, where a first biometric template has to be matched against a large number of second biometric templates, the total amount of time needed to compare the first biometric instance against the second biometric instances can be large. In some cases, time constraints can make biometric matching infeasible in applications where it would otherwise be useful. While biometric matching could be useful in airport security, matching a traveler's biometric against a large collection of biometrics could take several minutes, which is too long when a security checkpoint needs to process hundreds of travelers per hour. To address this problem, there is described according to some embodiments of the present disclosure, a controlled privacy biometric identification system.

FIG. 1 depicts a block diagram of a controlled privacy biometric identification system 100 according to some embodiments of the invention. The controlled privacy biometric identification system 100 (also referred to as a biometric identification system) includes a user 101 that operates a user device 101A, an access terminal 103, a processing computer 105, a translating computer 107, a first database server 109, a second database server 111, and a gateway computer 113.

In operation of the controlled privacy biometric identification system 100, it is assumed that each user has registered (himself/herself) with a biometric sample. It is noted that the biometric sample may be processed to generate a biometric template. Such a template is referred to herein as an enrollment biometric template of the user. Thus, a collection of enrollment biometric templates that corresponds to a plurality of users of the system 100 may be stored in a database. Such a collection of enrollment biometric templates is referred to as a gallery of biometric templates. Further, when a user desires to authenticate himself, the user provides another biometric sample, which may be processed to generate another biometric template. Such a template is referred to herein as a reference biometric template. It is noted that the reference biometric template of the user is used for performing a matching process with the plurality of enrollment biometric templates i.e., the gallery of biometric templates.

According to some embodiments, the gallery of enrollment biometric templates is comprised of one or more subsets of enrollment biometric templates, where each subset of the enrollment biometric templates is characterized by one or more salient features e.g., one may have a first subset of enrollment biometric templates corresponding to a first user group between the ages of 25-50, a second subset of enrollment biometric templates corresponding to a second user group between the ages of 51-70, a subset corresponding to a gender of the user e.g., males or females, a subset corresponding to a palm shape of the user, and the like. Each subset of enrollment biometric templates is also referred to herein as a slice and is associated with a unique identifier (e.g., a slice ID). It is noted that each slice of the gallery of enrollment biometric templates is associated with the one or more unique salient features.

In operation, the user 101 may interact with the access terminal 103 to commence an authentication process e.g., conduct a transaction. The access terminal 103 may correspond to a Point-Of-Sales (POS) device at a merchant's location e.g., a store. In interacting with the access terminal 103, the user 101 may provide a reference biometric sample to the access terminal. It is appreciated that the access terminal 103 may capture the user's reference biometric sample via one or more sensors included in the access terminal 103. Details regarding the architecture of the access terminal are described later with reference to FIG. 3. It is noted that in some implementations, the user 101 may utilize the user's device 101A in order to provide the reference biometric sample to the access terminal. Moreover, the access terminal 103 may process the reference biometric sample to generate a corresponding reference biometric template. The above described step of the user providing the reference biometric sample to the access terminal is depicted as step S1 in FIG. 1.

The access terminal 103 may process the reference biometric template corresponding to the user 101 (e.g., by extracting one or more salient features from the biometric template) to determine a slice of the gallery of enrollment templates to which the user belongs to. The access terminal 103 transmits a public key (e.g., public key of the access terminal) and the slice ID of the determined slice that the user belong to, to the processing computer 105. The above described operations that are performed by the access terminal 103 are depicted in FIG. 1 as step S2.

The processing computer 105 encrypts the reference biometric template corresponding to the user 101 using two public keys (e.g., a first public key and a second public key). By some embodiments, the processing computer 105 encrypts the reference biometric template using a first public key corresponding to the gateway computer 113 to generate a first encrypted reference biometric template. The processing computer 105 transmits the first encrypted reference biometric template along with the slice ID to the first database server 109. In a similar manner, the processing computer 105 encrypts the reference biometric template using a second public key corresponding to the translating computer 107 to generate a second encrypted reference biometric template. The processing computer 105 transmits the second encrypted reference biometric template along with the slice ID to the second database server 111. Additionally, the processing computer 105 transmits a third public key (e.g., public key corresponding to the access terminal 103) to the second database server 111. The operations performed by the processing computer 105 are depicted in FIG. 1 as step S3.

According to some embodiments, the first database server 109 and the second database server 111, respectively store encrypted enrollment biometric templates corresponding to the plurality of users of the system 100. For instance, in some embodiments, the first database server 109 stores enrollment biometric templates that are encrypted based on the first public key (i.e., public key corresponding to the gateway computer 113) and the second database server 111 stores enrollment biometric templates that are encrypted based on the second public key (i.e., public key corresponding to the translating computer 107).

The first database server 109 upon receiving the first encrypted reference biometric template and the slice ID from the processing computer 105, executes a first matching operation. Specifically, the first matching operation includes the first database server 109 retrieving a plurality of enrollment biometric templates included in a slice based on the slice ID that is obtained from the processing computer 105. It is noted that the plurality of enrollment biometric templates included in a slice are maintained in an encrypted form (i.e., encrypted based on the first public key associated with the gateway computer 113). Additionally, it is noted that the first matching operation is performed with reference to each encrypted enrollment biometric template included in the slice as opposed to performing a matching operation with all enrollment biometric templates included in the gallery of biometric templates.

The first matching operation includes generating a first set of encrypted match scores by comparing the first encrypted reference biometric template with each encrypted enrollment biometric template included in the plurality of enrollment biometric templates (i.e., encrypted templates included in the slice). It is appreciated that the first database server 109 generates the first set of encrypted match scores by comparing the first encrypted reference biometric template with each enrollment biometric template of the plurality of enrollment biometric templates in accordance with a first homomorphic encryption algorithm. The first homomorphic encryption algorithm may be one of a partial homomorphic encryption algorithm, a full homomorphic encryption algorithm, or the like. The first set of encrypted match scores as well as a set of enrollment biometric template identifiers associated with the first set of encrypted match scores (i.e., identifiers associated with the plurality of encrypted enrollment biometric templates included in the slice), are transmitted by the first database server 109 to the gateway computer 113 (as shown in step S4 in FIG. 1).

The gateway computer 113 upon receiving the first set of encrypted match scores from the first database server 109, obtains a first set of match scores by decrypting the first set of encrypted match scores using a first private key (i.e., a private key corresponding to the first public key and being associated with the gateway computer 113). According to some embodiments, the gateway computer 113 determines a subset of enrollment biometric template identifiers from the received set of enrollment biometric template identifiers based on a subset of match scores in the first set of match scores. For instance, the gateway computer 113, in one implementation, determines the subset of enrollment biometric template identifiers from the set of enrollment biometric template identifiers based on the subset of match scores being higher than a first preconfigured match score e.g., a top 1% of match scores in the first set of match scores. The gateway computer 113 transmits the subset of enrollment biometric template identifiers to the second database server 111 (as shown in step S5 in FIG. 1).

Thus, for example, if the gallery of enrollment biometric templates includes a total of 10 million biometric templates, where each slice includes 100,000 biometric templates (i.e., a total of 100 slices), the first database server 109 transmits 100,000 encrypted match scores (and corresponding biometric template identifiers) to the gateway computer 113. The gateway computer 113 in turn, decrypts the 100,000 encrypted match scores and identifies the top 1% of the match scores (i.e., top 1000 match scores). Further, the gateway computer 113 transmits enrollment biometric template identifiers corresponding to the top 1% of the match scores i.e., transmits 1000 enrollment biometric template identifiers to the second database server 111. It is appreciated that the computations performed by the gateway computer 113 are 'fuzzy' in nature (i.e., not exact). Specifically, although the gateway computer 113 has access to all the plaintext match scores (e.g., obtained upon decrypting the encrypted match scores received from the first database server 109), the gateway computer 109 may not be able to determine identities of the users associated with the match scores (i.e., the gateway computer 109 thus preserves privacy). Rather, the gateway computer 109 determines the top 1% of match scores and transmits the associated enrollment biometric template identifiers to the second database server 111 for exact biometric template identification as described below.

The second database server 111 performs a second matching operation with respect to the subset of enrollment biometric template identifiers that are received from the gateway computer 113. Specifically, the second database server 111 compares a second encrypted reference biometric template (i.e., the biometric template encrypted with the second public key corresponding to the translating computer) to encrypted enrollment biometric templates corresponding to the subset of enrollment biometric template identifiers.

In doing so, the second database server 111 generates a second set of encrypted match scores. It is noted that the second set of encrypted match scores may be generated by the second database server by comparing the second encrypted reference biometric template with each of the encrypted enrollment biometric templates corresponding to the subset of enrollment biometric template identifiers in accordance with a second homomorphic encryption algorithm. According to some embodiments, the second homomorphic encryption algorithm may be one of the following type: —partially homomorphic encryption algorithm, fully homomorphic encryption algorithm, or somewhat homomorphic encryption algorithm. Furthermore, in some embodiments, the second homomorphic encryption algorithm (implemented by second database server 111) is different than the first homomorphic encryption algorithm (implemented by first database server 109). The second database server 111 transmits the second set of encrypted match scores (i.e., match scores encrypted based on the second public key associated with the translating computer)

and the subset of enrollment biometric template identifiers to the translating computer 107 (shown as step S6 in FIG. 1).

In one implementation, the translating computer 107 decrypts the second set of encrypted match scores (received from the second database server 111) using a second private key corresponding to the second public key (and associated with the translating computer 107) to obtain a second set of match scores. Further, the translating computer 107 encrypts the second set of match scores with the third public key corresponding to the access terminal 103. It is appreciated that as stated previously, the third public key is transmitted by the processing computer 105 to the second database server 111. The second database server 111 in turn may provide the third public key to the translating computer 107. Upon encrypting the second set of match scores using the third public key, the translating computer 107 transmits the encrypted second set of match scores to the access terminal 103 (shown as step S7 in FIG. 1). According to some embodiments, the translating computer 107 may be configured to directly translate encrypted match scores (e.g., second set of match scores encrypted with the second public key) from being encrypted with the second public key to being encrypted with another public key (e.g., third public key corresponding to the access terminal 103). In this implementation, it is noted that the translating computer 107 does not access the plaintext match scores. It is appreciated that such a direct translation may be performed by proxy re-encryption techniques.

The access terminal 103 upon receiving the second set of encrypted match scores from the translating computer 107 (i.e., match scores encrypted using the third public key associated with the access terminal 103) decrypts the second set of encrypted match scores using a third private key (i.e., private key associated with the third public key). Upon decrypting the second set of encrypted match scores, the access terminal 103 identifies a highest match score and selects the enrollment biometric template identifier corresponding to the highest match score. Thereafter, in some embodiments, the access terminal 103 may transmit the selected enrollment biometric template identifier back to the second database server 111 to determine the user associated with the selected enrollment biometric template identifier (shown as step S8 in FIG. 1).

It is noted that the architecture of the controlled privacy biometric identification system 100 as shown in FIG. 1 is in no manner limited to include only the components as depicted therein. Rather, the controlled privacy biometric identification system 100 may include more components, for example, the system may include a third server, besides the first and second database servers. Such a server may correspond to a payment server that is configured to store payment credentials of users. Thus, the access terminal upon identifying a particular user, may communicate with the payment server to conduct a transaction. It is appreciated that the inclusion of the payment server provisions for a separation of payment credentials and identity information from biometric information. Furthermore, it is noted that in the controlled privacy biometric identification system 100 of FIG. 1, the gateway computer 113 and the first database server 109 may be controlled by a first service provider, whereas the second database server 111 may be controlled by a second service provider, and the translating computer 107 may be controlled by a third service provider, where the first service provider, the second service provider, and the third service provider are different or unique.

The controlled privacy biometric identification system 100 of FIG. 1 thus addresses the problem of executing homomorphic encryption matching on a large corpus of enrollment biometric templates in a couple of ways. Firstly, the controlled privacy biometric identification system 100 utilizes one or more features of a biometric sample to identify a slice (e.g., a group) of the corpus that the user is likely to belong to. Thereby, instead of performing computations on the entire corpus of enrollment biometric templates, embodiments of the present invention perform computations with respect to enrollment biometric templates included in the slice. For example, if the gallery of enrollment biometric templates includes a total of 10 million biometric templates, where each slice includes 100,000 biometric templates, the computations are reduced from 10 million comparisons to 100,000 comparisons.

Secondly, rather than imposing the computations of 100,000 enrollment biometric templates on the access terminal (e.g., a PoS device, which typically does not have high processing/computational capabilities), embodiments of the present disclosure utilize two separate database servers and a gateway computer. The processing of 100,000 enrollment biometric templates is assigned to the gateway computer (which typically has higher processing/computational capability than the PoS device). The gateway computer, via utilizing the two database servers further identifies a reduced number of enrollment biometric templates (e.g., top 1% i.e., 1000 templates), which is likely to include the user. The access terminal is thus provisioned with the task of executing this reduced number of operations.

Further, the controlled privacy biometric identification system of the present disclosure trades some privacy for feasibility in the following sense-compared with the homomorphic encryption approach (i.e., not a practical approach) the controlled privacy biometric identification system provides indices of biometric templates (associated with comparison scores being above a certain threshold) to the gateway computer. Thus, with suitable collusion, those indices could potentially expose sensitive information e.g., reveal how much a particular biometric reference is like another biometric reference. However, with proper security measures such as isolation of the gateway computer from the repository of biometric references e.g., the first and second database servers, such a risk is almost negligible.

FIG. 2 depicts a flowchart illustrating steps performed by a gateway computer included in the biometric identification system according to some embodiments of the invention. The process commences in step 201, where the gateway computer receives, from the first database server, a first set of encrypted match scores and a set of enrollment biometric template identifiers associated with the first set of encrypted match scores. It is noted that each encrypted match score in the first set of encrypted match scores is generated by comparing a first encrypted reference biometric template and an enrollment biometric template of a plurality of enrollment biometric templates stored in the first database server in an encrypted domain.

In step 203, the gateway computer decrypts the first set of encrypted match scores to obtain a first set of match scores. Such a decryption is performed by using a private key associated with the gateway computer. Thereafter, in step 205, the gateway computer determines a subset of enrollment biometric template identifiers from the set of enrollment biometric template identifiers based on a subset of match scores in the first set of match scores. For example, the gateway computer may determine the subset of enrollment biometric template identifiers from the set of enrollment biometric template identifiers based on the subset of match scores in the first set of match scores being higher than a first preconfigured match score e.g., top 1%.

Further, in step 207, the gateway computer transmits the subset of enrollment biometric template identifiers (determined in step 205) to a second database server (that is different than the first database server). It is appreciated that the second database server may be programmed to compare a second encrypted reference biometric template to encrypted enrollment biometric templates corresponding to the subset of enrollment biometric template identifiers and generate a second set of encrypted match scores.

In the above described embodiments, it is noted for instance, that the second database server 111 transmits encrypted scores of a top 1% of the match scores (e.g., 1000 match scores). In this process, we note that the second database server incurs a plurality of encryptions (i.e., 1000 encryptions) as each match score is individually encrypted. Furthermore, such a process would necessarily incur a plurality of decryption operations (i.e., 1000 operations). According to some embodiments of the present disclosure, an improvement is provided to reduce the number of encryption/decryption operations. For example, by one embodiment, there is provided a mechanism of encrypting the match scores in a block. Such a mechanism would require only a single encryption operation and a single decryption operation. It is noted that such a mechanism is feasible due to multiplicative property of homomorphic encryption (i.e., $\{a\}\times\{b\}=\{ab\}$). Thus, one can encode the indices as primes, such that the product uniquely resolves to the factors of the prime. The mechanism of encoding the block as primes is described as follows:

Assume we have M pairs labeled as $(a_1, b_1)$, $(a_2, b_2)$, $(a_3, b_3)$ . . . $(a_M, b_M)$, where the $a_i$ is an index for the gallery of enrollment biometric templates, and $b_i$ is a comparison score of a reference biometric template and the $i^{th}$ enrollment biometric template. Thus, it is reasonable to expect that parameter $a_i$ will be in the range of [1:10 million] and the parameter $b_i$ will be in the range of [1:100]. According to one embodiment, we represent the above set of pairs by a product of primes as follows: $a_i$ is represented by the $a_i^{th}$ prime equal to: $(4(i-1)+1) \mod M$, and $b_i$ is represented by the $b_a^{th}$ prime equal to: $(4(i-1)+3) \mod M$.

As an example, assuming M=4, then
  $a_1$ is represented by the prime equal to 1 mod 16
  $a_2$ is represented by the prime equal to 5 mod 16
  $a_3$ is represented by the prime equal to 9 mod 16
  $a_4$ is represented by the prime equal to 13 mod 16, whereas
  $b_1$ is represented by the prime equal to 3 mod 16
  $b_2$ is represented by the prime equal to 7 mod 16
  $b_3$ is represented by the prime equal to 11 mod 16, and
  $b_4$ is represented by the prime equal to 15 mod 16.

Accordingly, the set of pairs is represented by the product of all these primes. It is noted that one can derive the individual elements from such a representation, as one knows which prime factor is represented by a certain element. It is obvious that encoding the match scores as a block in contrast to individually encoding the scores will incur an increase in the number of bits required for the encoding. In what follows, there is provided a detailed description contrasting the number of bits required for the two encoding techniques.

By Rosser's theorem, it is known that the $n^{th}$ prime is in the interval: [n ln n+n (ln ln n−1), n ln n+n ln ln n]. For n>5, where 'ln' corresponds to a natural logarithm operation, we use the approximately correct assumption that the $n^{th}$ prime equal to j mod 4M, (for j being odd and less than 4M), is in the interval:

$$[t \ln t + t(\ln \ln t - 1), t \ln t + t \ln \ln t],$$

where the parameter t=2*M*n. The reason for this is as follows—in this situation, the sequence of primes has been divided into 2*M roughly equivalent sequences of primes, so that the $n^{th}$ prime among all primes roughly corresponds to the 2*M*$n^{th}$ prime in any of the 2*M sequences of primes.

For example, based on the above discussion, the $200^{th}$ prime should be in the interval [200 ln 200+200 (ln(ln 200) −1, 200 ln 200+200 ln(ln 200)] (i.e., in the interval [1194, 1261]), whereas in practice it is actually 1223. The $200^{th}$ prime congruent to 5 mod 16 should according to this reasoning be in the interval [1600 ln 1600+1600 (ln ln 1600 −1), 1600 ln 1600+1600 ln ln 1600] (i.e., in the interval [13,402 to 15,002]), whereas in practice it is actually 13,093.

Thus, if we let M be the number of pairs, $N_a$ correspond to the largest possible value for parameter $a_i$ and $N_b$ correspond to the largest possible value for parameter $b_i$, then each pair can be represented by two primes, X and Y, where X is at most: $X=t_a(\ln t_a + \ln(\ln t_a))$, and Y is at most: $Y=t_b(\ln t_b + \ln(\ln t_b))$, where parameter $t_a=2*M*N_a$ and parameter $t_b=2*M*N_b$. Thus, the product of these two primes will have log 2(XY) bits, and the product of all the M pairs will have M*log 2(XY) bits. The table below depicts M*log 2(XY) for values of M=1, 10, 100, 1000, 10000, and values of the first component of a pair up to 10,000,000 and the second component up to 100, where parameter $t_a=2*M*10,000,000$ and parameter $t_b=200*M$.

| M | $t_a$ | $t_b$ | X | Y | M*log2(XY) |
|---|---|---|---|---|---|
| 1 | 20000000 | 200 | 392,665,814 | 1393 | 39 |
| 10 | 200000000 | 2000 | 4,412,847,995 | 19258 | 463 |
| 100 | 2000000000 | 20000 | 48,961,141,218 | 243927 | 5341 |
| 1000 | 20000000000 | 200000 | 537,705,488,911 | 2,941,601 | 60,456 |
| 10000 | 2E+11 | 2000000 | 5,856,101,904,073 | 34,366,807 | 674,476 |

From the above table and referring to the last column, it can be observed that a block of 100 pairs would require 5341 bits encoded in a block, as compared to 100*39=3900 bits if left as individual pairs. Thus, one can conclude that only a modest overhead in incurred in the process of encoding the pairs in blocks.

Figure 3:
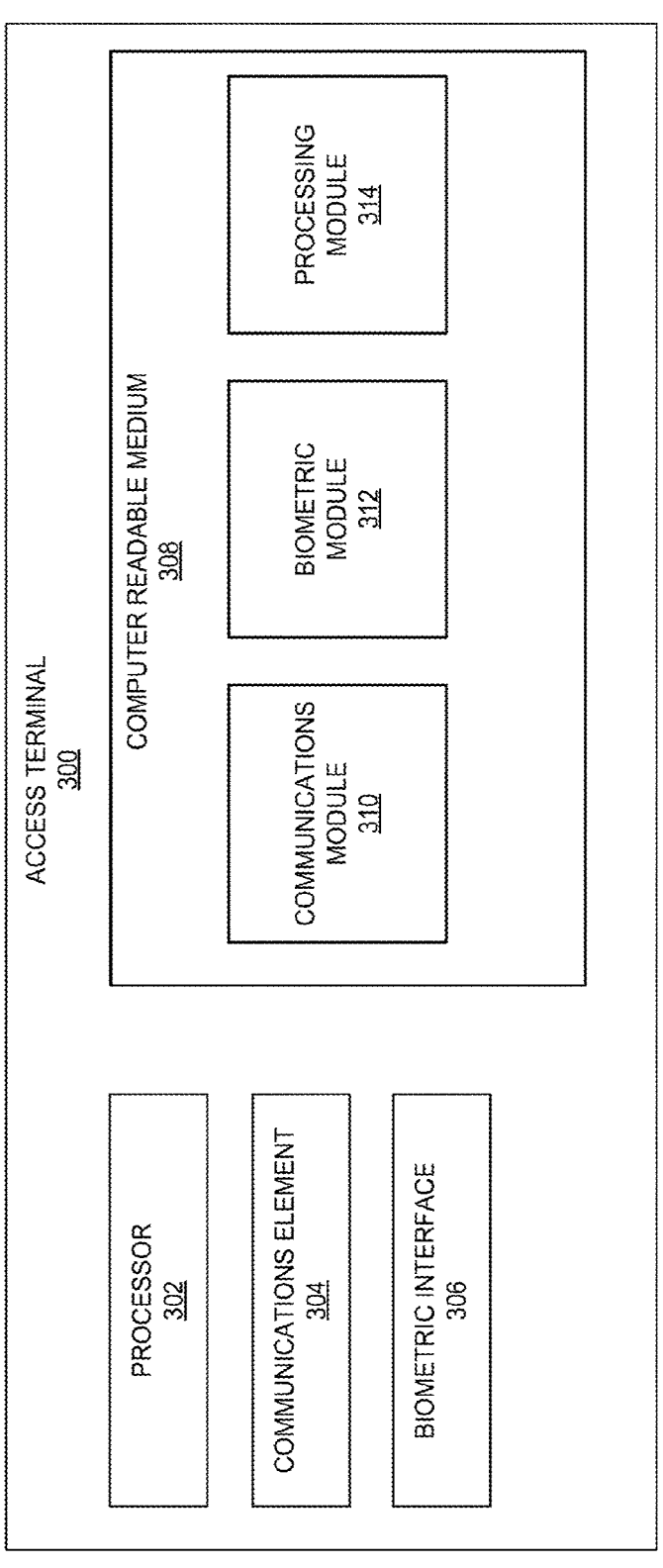
FIG. 3 shows a system block diagram of an access terminal according to some embodiments of the invention.

FIG. 3 shows an exemplary access terminal 300 according to some embodiments of the invention. The access terminal may comprise a processor 302, a communications element 304, a biometric interface 306, and a computer readable medium 308 comprising a communications module 310, a biometrics module 312, and a processing module 314.

The processor 302 may be any suitable processing apparatus or device as described above. The communications element 304 may comprise a network interface that enables the access terminal 300 to communicate with other computers or systems over a network such as the Internet.

Biometrics interface 306 may comprise hardware used to capture biometric instances from a user or device operated by the user e.g., user device 101A of FIG. 1. As an example, biometric interface 306 may comprise a retina scanner, including a low energy infrared light emitter and infrared light detector. The retina scanner may shine infrared light onto a user's eye, then record reflected infrared light picked up by the detector. The recorded light may be compiled into a data file that can be stored on computer readable medium 308. The biometric interface may be supported by the biometric software module 312, which may comprise code, executable by the processor 302, for controlling the operation of the biometrics interface 306. As an example, the biometric module 312 may comprise signal processing algorithms or other optical processing algorithms used to convert a sample data file into a biometric instance. As an alternative to a retina scanner, biometrics interface 306 could be a fingerprint scanning device, a palm vein scanner, a microphone (used to capture a biometric such as speech), a high resolution camera used for capturing face scans, etc. In some embodiments, biometrics interface 306 may also comprise non-hardware components that may be used as part of a biometrics capture. For instance, biometrics interface 306 may include a chin rest, which allows a user to align their face with a face or eye scanning device.

The communications module 310 may comprise code that causes or enables the processor 302 to generate messages, reformat messages, and/or otherwise communicate with other entities or computers. This may include receiving demographics information, demographics match determinations, or biometric match determinations, among others, from mobile devices. The communication module 310 may enable the access terminal to communicate over a network according to any appropriate communication protocol, such as TCP, UDP, etc.

Biometrics module 312 may comprise code and other software routines and subroutines, executable by the processor 302 for performing biometric related operations in a biometric based hands-free interaction system, such as software used to operate biometrics interface 306 during a biometrics capture. As an example, for a face scanner, biometrics module 312 may include code used to change the aperture or focus of the scanning lens. Additionally, biometrics module 312 may comprise code, enabling the access terminal 300 to process the raw data captured by biometrics interface 306. This may include optical processing routines and subroutines used to convert raw data into a facial scan, or eigenvectors used in facial recognition.

Biometrics module 312 may also comprise code, executable by the processor 302 for inferring demographics information from a captured biometric instance. This may include evaluating the biometric instance to detect any patterns that correlate to particular demographics, such as the presence of facial wrinkles in the face scans of elderly users, or iris stroma patterns correlated with heredity and ethnicity. This code may include machine learning models, including machine learning classifiers that accept biometrics instances as feature vectors and produce a classification in the form of demographics information, such as the age, biological sex, and ethnicity of a user.

Further, biometrics module 312 may comprise code enabling the access terminal 300 to securely store and manage biometric instances and demographics information. Including any cryptographic operations necessary to securely encrypt demographics information and biometrics instances. Further, biometrics module 312 may comprise code enabling access terminal 300 to perform homomorphic encryption as part of a biometric matching procedure, as well as perform fuzzy extraction operations, such as generating a random string from a biometric instance. Biometrics module 312 may additionally allow access terminal 300 to perform secure multi-party encryption, including the use of garbled circuits and the process of oblivious transfer, in order to compare biometric instances with biometric instances stored on mobile devices.

Processing module 314 may comprise code or instructions, executable by the processor 302 for securely handling payment information, credentials including tokens, authorization request messages, and authorization response messages. Processing module 314 may allow the access terminal 300 to receive payment credentials such as payment account numbers from mobile devices, generate an authorization request message, then forward the authorization request message to an issuer via a merchant, an acquirer, and a payment processing network. Processing module 314 may comprise code enabling a hands-free interaction with a mobile device, such as a payment transaction with a mobile device that requires no explicit input or interaction by a user of the mobile device.

Figure 4:
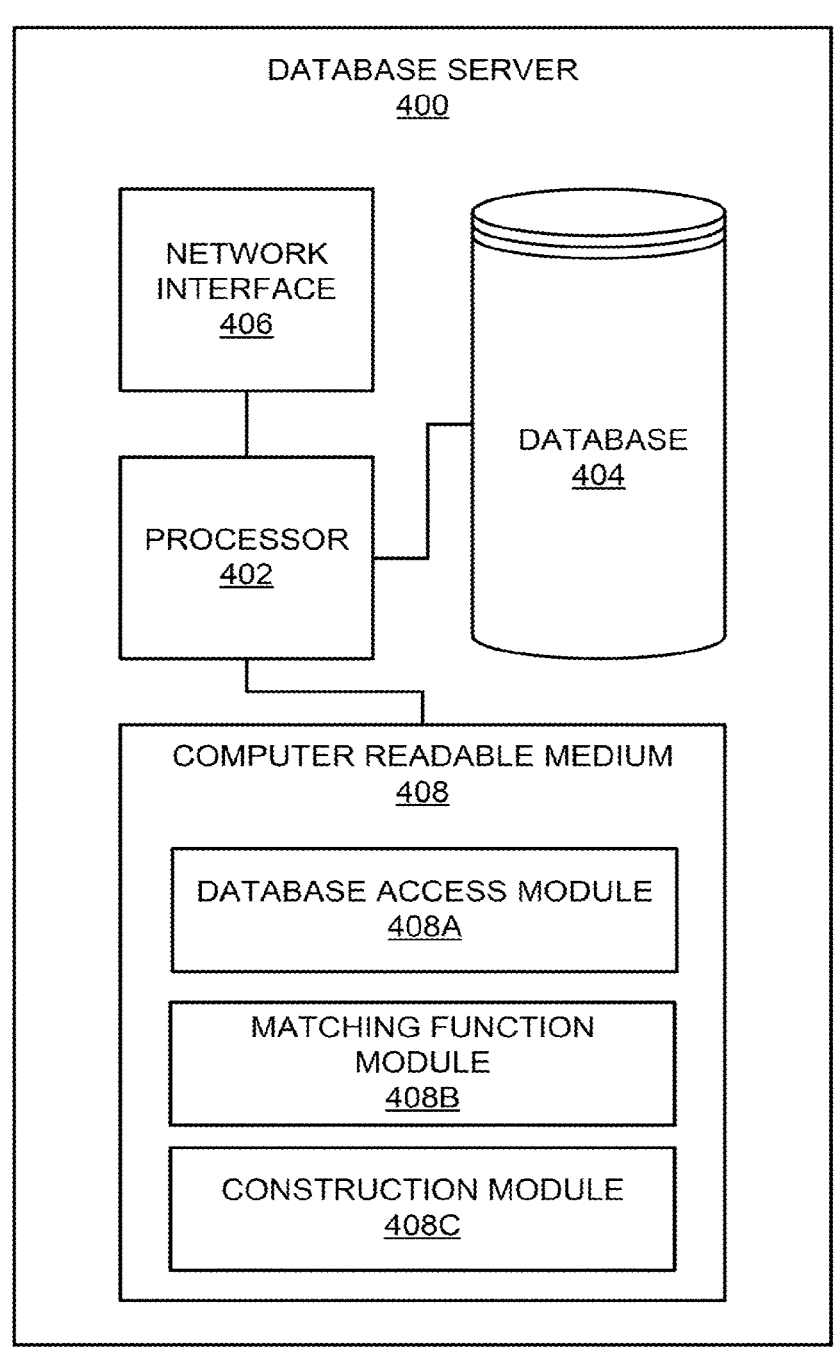
FIG. 4 shows a block diagram of components of a database server according to an embodiment of the invention.

FIG. 4 shows a block diagram of components of a database server according to an embodiment of the invention. By some embodiments, the first database server 109 and the second database server 111 of FIG. 1 may have an architecture corresponding to the database server 400 of FIG. 4. The exemplary database server 400 may comprise a processor 402, a database 404, a network interface 406, and a computer readable medium 408. The computer readable medium 408 can comprise a database access module 408A, a matching function module 408B, and a construction module 408C.

The database 404 may store data, such as encrypted biometric templates, securely. For example, the first database server 109 may store encrypted biometric templates that are encrypted using a public key (e.g., first public key) associated with the gateway computer 113. Similarly, the second database server 111 may store encrypted biometric templates that are encrypted using another public key (e.g., second public key) associated with the translating computer 107. The database 404 may be a conventional, fault tolerant, relational, scalable, secure database such as those commercially available from Oracle™ or Sybase™.

The network interface 406 may include an interface that can allow the database server 400 to communicate with external computers. Network interface 406 may enable the database server 400 to communicate data to and from another device (e.g., processing computer 105, translating computer 107, gateway computer 113, etc.). Some examples of the network interface 406 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 406 may include Wi-Fi™. Data transferred via network interface 406 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 406 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 408 may comprise code, executable by the processor 402, to implement a method comprising: a) receiving, by a database server from a processing computer, a first encrypted reference biometric template, wherein the database server stores a plurality of encrypted enrollment biometric templates; b) for each of a plurality of encrypted enrollment biometric templates in the database server, inputting, by the database server, the first encrypted reference biometric template and an encrypted enrollment biometric template into a function to obtain an encrypted match value; c) for each of the plurality of encrypted enrollment biometric templates in the database server, determining if the encrypted match value is greater than a predetermined threshold; and d) providing a subset of identifiers (associated with the encrypted enrollment biometric templates) to a gateway computer. It is appreciated that database server, in one embodiment may perform the above steps of determining match value or scores with respect to a slice (i.e., subset) of the plurality of encrypted enrollment biometric templates. This may be done based on a slice identifier received from the processing computer.

The database access module 408A may comprise code or software, executable by the processor 402 for accessing the database 404. The database server 400 may use the database access module 408A in order to retrieve encrypted enrolled biometric templates. Additionally, the database access module 408A may be used by the database server 400 in order to store new encrypted biometric templates, such as a first encrypted biometric template received from a processing computer, in the database 404.

The matching function module 408B may, in conjunction with the processor 402, perform a matching function to determine an encrypted match value or match score between two encrypted biometric templates. In some embodiments, the matching function module 408B may use homomorphic encryption. More precisely, assume that a biometric comparison (i.e., matching) algorithm match( ) is given, where match takes two biometric templates T1 and T2 as input and yields a match value as an output, which, in some embodiments, can be an integer from 0 to 99, with 99 indicating a very good match and 0 indicating no match. A function M( ) can be defined as follows:

$M(T1, T2) :=$ if $match(T1, T2) \geq t$ then return $match(T1, T2)$ else return $ran( )$. Here, t is a predetermined threshold, which can be an integer in $\{0, \ldots 99\}$, and $ran( )$ can generate a unique random value drawn from a large set, such as, e.g. 128-bit integers. t can indicate when two templates are considered to match (when the match value is at least t). From the function M and a public key K, using the techniques of homomorphic encryption, a function $M_K( )$ can be constructed, with the property that for all T1 and T2, $M_K(\{T1\}\ K, \{T2\}\ K) = \{M(T1, T2)\}\ K$, that is, encryption with the public key K distributes over the modified matching calculation.

The database server 400 may use a public key encryption scheme. Typically, the encryption scheme may be either RSA or elliptic curve (El Gamal). The public key K can be used by the devices in the system. The corresponding private key need not be taken into account, and in some embodiments, can be discarded and remain unused after generation of the key pair. Furthermore, it is appreciated that although the first database server 109 and the second database server 111 may have the architecture of the database server 400 of FIG. 4, the first database server 109 may implement a different matching algorithm as compared to the one implemented by the second database server 111.

The construction module 408C may, in conjunction with the processor 402, may be configured to construct a first set of encrypted match scores and a set of enrollment biometric template identifiers associated with the first set of encrypted match scores, where each encrypted match score in the first set of encrypted match scores is generated by comparing a first encrypted reference biometric template and an enrollment biometric template of a plurality of enrollment biometric templates stored in the database 404 in an encrypted domain. Such a constructed first set of encrypted match scores and set of enrollment biometric template identifiers may be transmitted by the database server 400 to a gateway computer for further processing. Additionally, the database server 400 may also be configured to perform the previously described enhanced encryption process i.e., a process where instead of encrypting a certain number of elements (e.g., biometric templates) individually. the database server 400 may perform batch/block encryption of the elements thereby reducing the number of decryption operations required.

Figure 5:
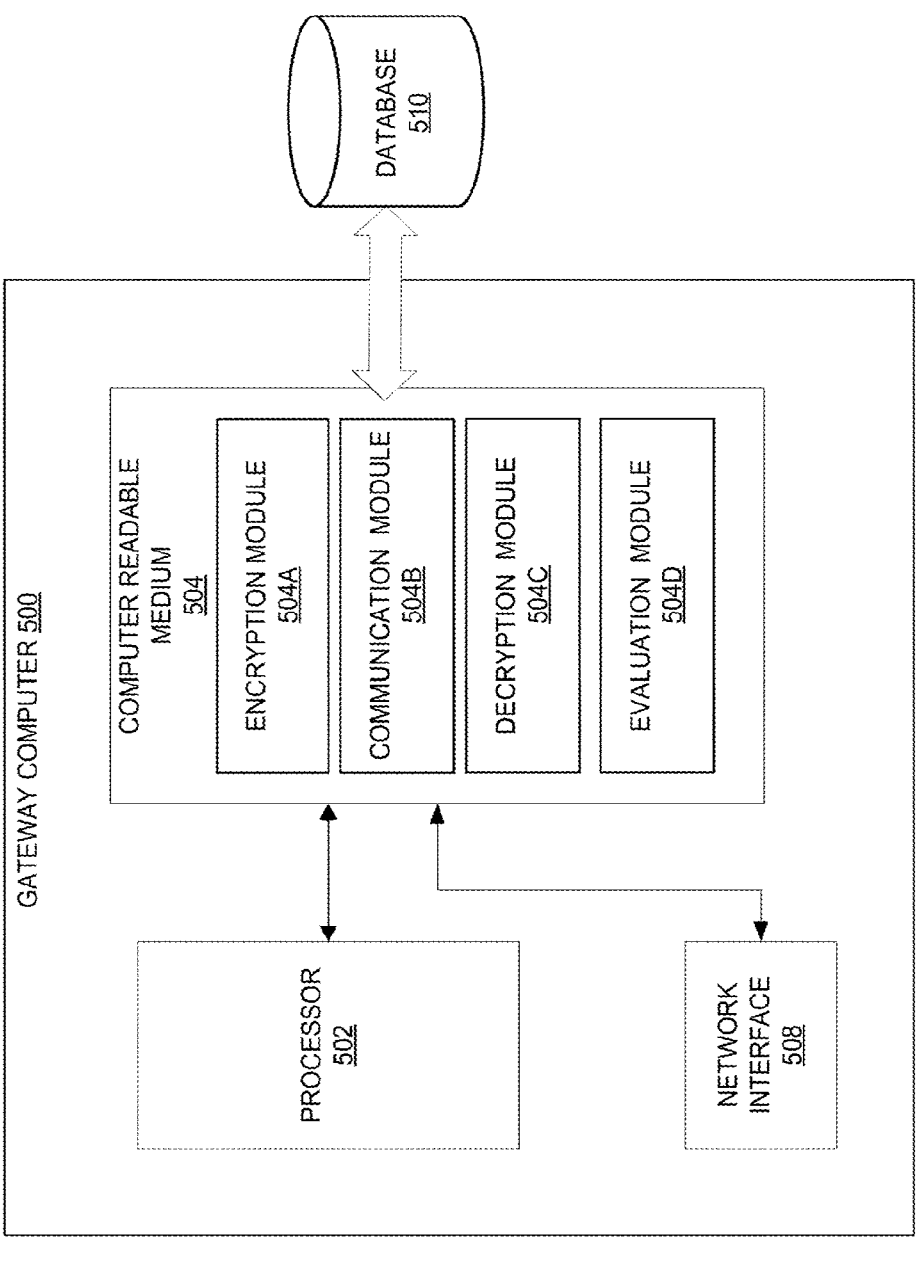
FIG. 5 depicts a block diagram of a gateway computer according to an embodiment of the invention.

FIG. 5 depicts a block diagram of a gateway computer according to an embodiment of the invention. The gateway computer 500 may comprise a processor 502, a network interface 508, and a computer readable medium 504 comprising an encryption module 504A, a communications module 504B, a decryption module 504C, and an evaluation module 504D.

The processor 502 may be any suitable processing apparatus or device as described above. The network interface 508 may include an interface that can allow the gateway computer 500 to communicate with external computers. Network interface 508 may enable the gateway computer 500 to communicate data to and from another device (e.g., resource provider computer, authorization computer, database servers, etc.). Some examples of the network interface 508 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 508 may include Wi-Fi™.

Data transferred via network interface 508 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 508 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 504 may comprise code, executable by the processor 502. The computer readable medium 504 may contain any number of applications, modules, and code. The computer readable medium 504 may comprise code, executable by the processor 502, to implement a method comprising: (i) receiving a first set of encrypted match scores from a first database server and a set of enrollment biometric template identifiers associated with the first set of encrypted match scores. Each encrypted match score in the first set of encrypted match scores is generated by comparing a first encrypted reference biometric template and an enrollment biometric template of a plurality of enrollment biometric templates stored in the first database server in an encrypted domain, (ii) decrypting the first set of encrypted match scores to obtain a first set of match scores, (iii) determining a subset of enrollment biometric template identifiers of the set of enrollment biometric template identifiers based on a subset of match scores in the first set of match scores, and (iv) transmitting the subset of enrollment biometric template identifiers to a second database server, wherein the second database server is programmed to compare a second encrypted reference biometric template to encrypted enrollment biometric templates corresponding to the subset of enrollment biometric template identifiers and generate a second set of encrypted match scores by comparing the second encrypted reference biometric template to each of the encrypted enrollment biometric templates corresponding to the subset of enrollment biometric template identifiers.

The encryption module 504A and decryption module 504C of the gateway computer 500 may be software components or libraries that provide functionality for encrypting and decrypting data (e.g., biometric templates) respectively, using various encryption/decryption algorithms. The encryption module may be configured to implement popular encryption algorithms such as AES, RSA, and SHA, as well as provide functionality for key management, random number generation, and other cryptographic operations. It is noted that these components may also provide functionality for generating and verifying digital signatures to ensure data integrity and authenticity. It is noted that the encryption module 504A and decryption module 504C enable sensitive data to be protected from unauthorized access and ensure data confidentiality, integrity, and authenticity. Further, the decryption module in some embodiments, may be configured to decrypt, encrypted data received from another component of the biometric identification system of FIG. 1 e.g., first database server, using a private key associated with the gateway computer 500. It is noted that the private key of the gateway computer may be stored securely in a database 510 associated with the gateway computer 500.

The communications module 504B is a component or software library that facilitates communication between different systems, devices, or components of the gateway computer 500. Such a module provides the necessary functionality and protocols to enable data exchange, messaging, and interaction across networks or between software components. The communication module 504C may enable the gateway computer 500 to communicate over a network according to any appropriate communication protocol, such as TCP, UDP, etc.

The evaluation module 504D of the gateway computer 500 is configured to perform processing operations with respect to data received from other components of the biometric identification system of FIG. 1 of the present disclosure. For instance, the evaluation module 504D may be configured to receive a first set of encrypted match scores from a first database server and a set of enrollment biometric template identifiers associated with the first set of encrypted match scores. The evaluation module 504D may utilize the decryption module 504C decrypt the first set of encrypted match scores to obtain a first set of match scores. Further, the evaluation module 504D may process the first set of match scores to determine a subset of match score in the first set that are greater than a predetermined threshold score. Accordingly, the evaluation module 504D may be configured to identify a subset of enrollment biometric template identifiers of the set of enrollment biometric template identifiers for which the match score (of the corresponding biometric template) is greater than the predetermined threshold score. Such processed data may be transmitted by the evaluation module 504D of the gateway computer 500 to other components e.g., second database server 111 of FIG. 1 for further processing.

Figure 6:
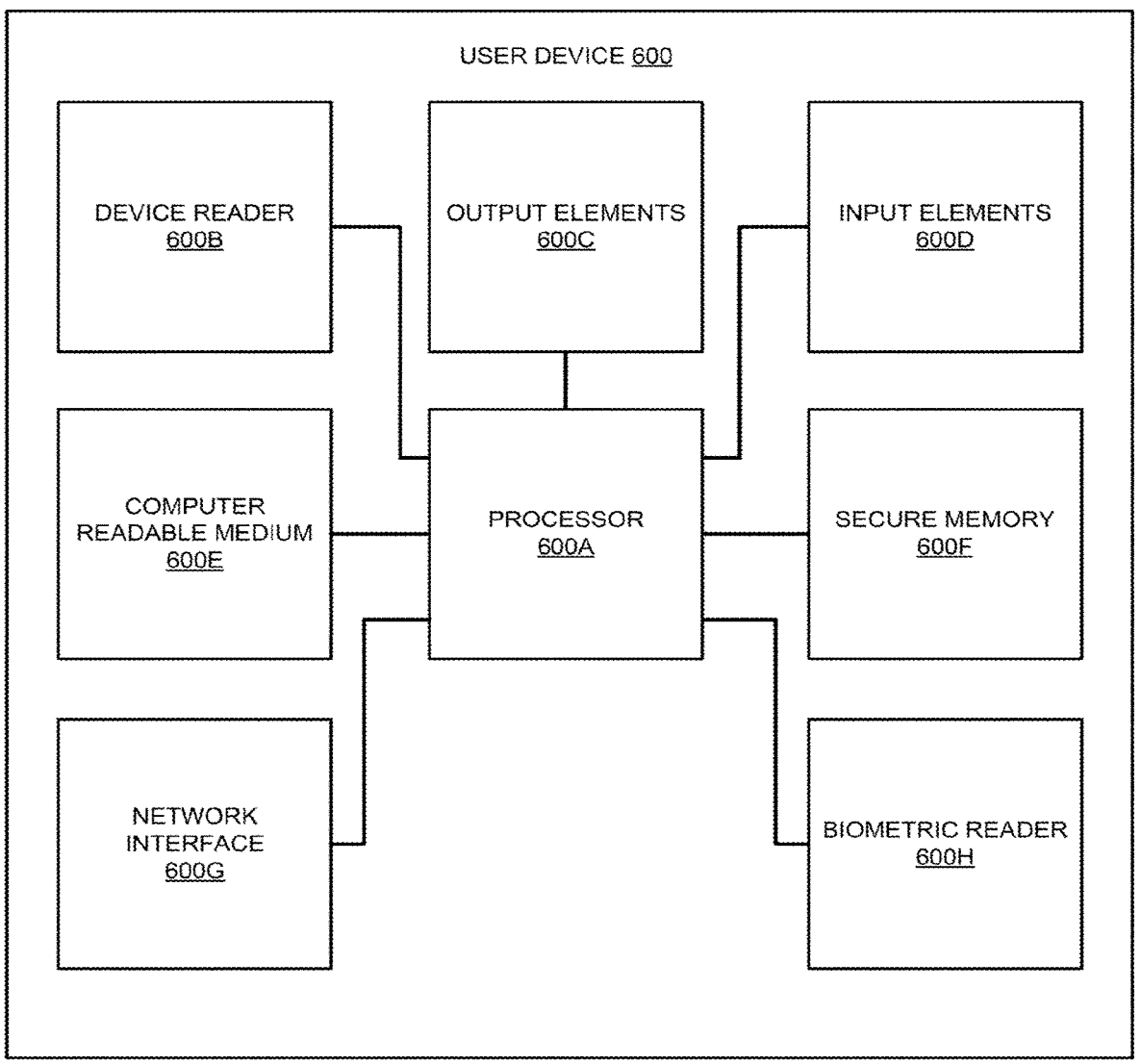
FIG. 6 shows a block diagram of components of a user device according to an embodiment of the invention.

FIG. 6 shows a block diagram of components of a user device 600 according to an embodiment of the invention. The user device 600 may correspond to user device 101A of FIG. 1. The exemplary user device 600 may comprise a processor 600A, a device reader 600B, an output element 600C, an input element 600D, a computer readable medium 600E, a secure memory 600F, a network interface 600G, and a biometric reader 600H.

The device reader 600B may comprise any suitable device capable of reading, providing, or writing data to or from a user device 600. Suitable device readers include antennas, electrical contacts, etc. The output elements 600C may comprise any suitable devices that may output data. Examples of output elements 600C may include display screens, speakers, and data transmission devices. The input elements 600D may include any suitable device capable of inputting data into the user device 600. Examples of input devices include buttons, touchscreens, touch pads, microphones, etc.

The computer readable medium 600E may comprise code, executable by the processor 600A. The computer readable medium 600E may contain any number of applications, modules, and code. The computer readable medium 600E may comprise code, executable by the processor 600A, to implement a method comprising: receiving, by a user device, a biometric sample from a user; creating, by the user device, a first biometric template from the biometric sample; encrypting, by the user device, the first biometric template with a public key to yield a first encrypted biometric template; transmitting, by the user device, the first encrypted biometric template to a server computer, wherein for each of a plurality of encrypted enrollment biometric templates stored in the server computer, the server computer inputs the first encrypted biometric template and an encrypted enrollment biometric template into a function to obtain an encrypted match value, wherein for each of the plurality of encrypted enrollment biometric templates the server computer determines if the encrypted match value corresponds to an unencrypted match value using a table; and receiving, by the user device, a notification regarding the unencrypted match value.

The secure memory 600F may store encrypted data such as encrypted biometric templates, key identifiers, public keys, and any other relevant data securely. The secure memory 600F may be in the form of a secure element, a hardware security module, or any other suitable form of secure data storage.

The network interface 600G may include an interface that can allow the user device 600 to communicate with external computers. Network interface 600G may enable the user device 600 to communicate data to and from another device (e.g., resource provider computer, authorization computer, etc.). Some examples of the network interface 600G may include a modem, a physical network interface (such as an Ethernet card or other Network Interface Card (NIC)), a virtual network interface, a communications port, a Personal Computer Memory Card International Association (PCM- CIA) slot and card, or the like. The wireless protocols enabled by the network interface 600G may include Wi-Fi™.

Data transferred via network interface 600G may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 600G and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The biometric reader 600H can be a device capable of obtaining a biometric sample from a user of the user device 600. For example, the biometric reader 600H can be an iris scanner, hand scanner, ear scanner, voice scanner, DNA scanner, and/or the like.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an." or "the" is intended to mean "at least one," unless specifically indicated to the contrary.

23

24

What is claimed is:

1. A method comprising:

receiving, by a gateway computer, a first set of encrypted match scores from a first database server and a set of enrollment biometric template identifiers associated with the first set of encrypted match scores, each encrypted match score in the first set of encrypted match scores being generated by comparing a first encrypted reference biometric template and an enrollment biometric template of a plurality of enrollment biometric templates stored in the first database server in an encrypted domain, wherein the first database server generates the first set of encrypted match scores by comparing the first encrypted reference biometric template with each enrollment biometric template of the plurality of enrollment biometric templates in accordance with a first homomorphic encryption algorithm;

decrypting, by the gateway computer, the first set of encrypted match scores to obtain a first set of match scores;

determining, by the gateway computer, a subset of enrollment biometric template identifiers of the set of enrollment biometric template identifiers based on a subset of match scores in the first set of match scores; and transmitting, by the gateway computer, the subset of enrollment biometric template identifiers to a second database server, wherein the second database server is programmed to compare a second encrypted reference biometric template to encrypted enrollment biometric templates corresponding to the subset of enrollment biometric template identifiers and generate a second set of encrypted match scores by comparing the second encrypted reference biometric template to each of the encrypted enrollment biometric templates corresponding to the subset of enrollment biometric template identifiers.

2. The method of claim 1, wherein the first database server is different than the second database server, the first database server being controlled by a first service provider and the second database server being controlled by a second service provider that is different than the first service provider.

3. The method of claim 1, wherein the first encrypted reference biometric template is encrypted based on a first public key of the gateway computer, and the second encrypted reference biometric template is encrypted based on a second public key of a translating computer, the first encrypted reference biometric template being stored in the first database server, and the second encrypted reference biometric template being stored in the second database server.

4. The method of claim 3, wherein the gateway computer and the first database server are controlled by a first service provider, the second database server is controlled by a second service provider, and the translating computer is controlled by a third service provider, wherein each of the first service provider, the second service provider, and the third service provider is unique.

5. The method of claim 1, wherein each enrollment biometric template of the plurality of enrollment biometric templates stored in the first database server is encrypted based on a first public key of the gateway computer.

6. The method of claim 1, wherein each enrollment biometric template of the plurality of enrollment biometric templates stored in the second database server is encrypted based on a second public key of a translating computer.

7. The method of claim 1, wherein the second database server generates the second set of encrypted match scores by comparing the second encrypted reference biometric template with each of the encrypted enrollment biometric templates corresponding to the subset of enrollment biometric template identifiers in accordance with a second homomorphic encryption algorithm.

8. The method of claim 7, wherein the first homomorphic encryption algorithm is different than the second homomorphic encryption algorithm.

9. The method of claim 1, wherein the plurality of enrollment biometric templates is selected from a group of enrollment biometric templates based on one or more features associated with a reference biometric template that is obtained from an access terminal.

10. The method of claim 1, wherein the gateway computer determines the first set of match scores by decrypting the first set of encrypted match scores based on a first private key corresponding to a first public key associated with the gateway computer.

11. The method of claim 1, wherein the gateway computer determines the subset of enrollment biometric template identifiers from the set of enrollment biometric template identifiers based on the subset of match scores in the first set of match scores being higher than a first preconfigured match score.

12. The method of claim 1, wherein the second database server is configured to transmit the second set of encrypted match scores to a translating computer, each match score in the second set of encrypted match scores being associated with an enrollment biometric template identifier from the subset of enrollment biometric template identifiers.

13. The method of claim 12, wherein each match score in the second set of encrypted match scores is encrypted based on a second public key of the translating computer.

14. The method of claim 13, wherein the translating computer is further configured to:

decrypt the second set of encrypted match scores with a second private key corresponding to the second public key to obtain a second set of match scores;

encrypt the second set of match scores with a third public key corresponding to an access terminal; and transmit the second set of match scores encrypted with the third public key to the access terminal.

15. A gateway computer comprising:

a processor; and a non-transitory computer readable medium coupled to the processor and comprising code, executable by the processor, for implementing a method comprising receiving a first set of encrypted match scores from a first database server and a set of enrollment biometric template identifiers associated with the first set of encrypted match scores, each encrypted match score in the first set of encrypted match scores being generated by comparing a first encrypted reference biometric template and an enrollment biometric template of a plurality of enrollment biometric templates stored in the first database server in an encrypted domain, wherein the first database server generates the first set of encrypted match scores by comparing the first encrypted reference biometric template with each enrollment biometric template of the plurality of enrollment biometric templates in accordance with a first homomorphic encryption algorithm;

decrypting the first set of encrypted match scores to obtain a first set of match scores;

determining a subset of enrollment biometric template identifiers of the set of enrollment biometric template identifiers based on a subset of match scores in the first set of match scores; and transmitting the subset of enrollment biometric template identifiers to a second database server, wherein the second database server is programmed to compare a second encrypted reference biometric template to encrypted enrollment biometric templates corresponding to the subset of enrollment biometric template identifiers and generate a second set of encrypted match scores by comparing the second encrypted reference biometric template to each of the encrypted enrollment biometric templates corresponding to the subset of enrollment biometric template identifiers.

16. The gateway computer of claim 15, wherein the first encrypted reference biometric template is encrypted based on a first public key of the gateway computer, and the second encrypted reference biometric template is encrypted based on a second public key of a translating computer, the first encrypted reference biometric template being stored in the first database server, and the second encrypted reference biometric template being stored in the second database server.

17. The gateway computer of claim 15, wherein each enrollment biometric template of the plurality of enrollment biometric templates stored in the first database server is encrypted based on a first public key of the gateway computer, and each enrollment biometric template of the plurality of enrollment biometric templates stored in the second database server is encrypted based on a second public key of a translating computer.

18. The gateway computer of claim 15, wherein the second database server generates the second set of encrypted match scores by comparing the second encrypted reference biometric template with each of the encrypted enrollment biometric templates corresponding to the subset of enrollment biometric template identifiers in accordance with a second homomorphic encryption algorithm that is different than the first homomorphic encryption algorithm.

* * * * *